Figure 4:
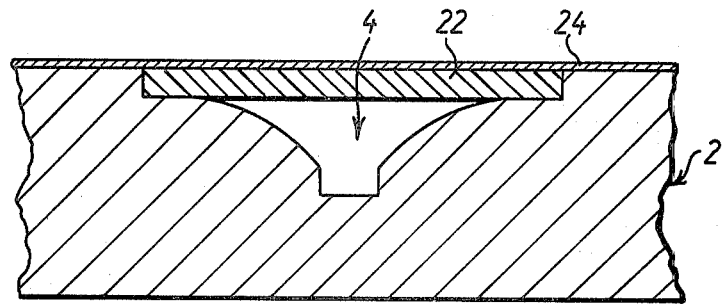

United States Patent [19]
Emms et al.

[11] 4,387,128
[45] Jun. 7, 1983

[54] FOLDABLE STRUCTURE

[75] Inventors: Roy O. Emms, Paddock Wood; William Rae, Southborough; John Wilson, Rochester, all of England

[73] Assignee: Brymitre Limited, Sevenoaks, England

[21] Appl. No.: 166,848

[22] Filed: Jul. 8, 1980

[30] Foreign Application Priority Data

Jul. 12, 1979 [GB] United Kingdom ............... 7924390

[51] Int. Cl.³ .................... B32B 3/02; E04C 2/24; E04C 2/40; B32B 3/10
[52] U.S. Cl. .................................... 428/60; 428/57; 428/77; 428/121; 428/124; 428/130; 428/157; 428/192; 428/455; 428/507; 428/514; 156/258; 156/304.3; 156/304.5; 52/631; 52/658; 160/381; 403/402
[58] Field of Search ............... 403/402, 401; 52/631, 52/658; 160/381; 428/33, 57, 58, 60, 67, 77, 121, 124, 157, 129, 130, 192, 535, 537, 455, 507, 532, 514; 156/304.3, 304.5, 258, 211

[56] References Cited
U.S. PATENT DOCUMENTS 2,026,650  1/1936  Onrud ................... 52/631
2,252,539  8/1941  Adams ............ 156/304.5 X
3,895,990  7/1975  Josteit ............ 156/304.5 X Primary Examiner—Alexander S. Thomas
Attorney, Agent, or Firm—Raymond N. Baker

[57] ABSTRACT

A foldable structure (2) and a method of manufacturing a foldable structure which, when folded produces a curved edge or corner. The structure comprises two panel members (32,34) having a respective edge region (18,20) which are adjacent and are spaced apart. Each edge region has a shoulder (8,10) and a curved portion (12,14). A flexible elongated bridging piece (22) is located between the shoulders (8,10) and defines a foldable region. A flexible lamina (24) covers a respective face of the panel members (32,34) and the flexible bridging piece (22).

9 Claims, 9 Drawing Figures

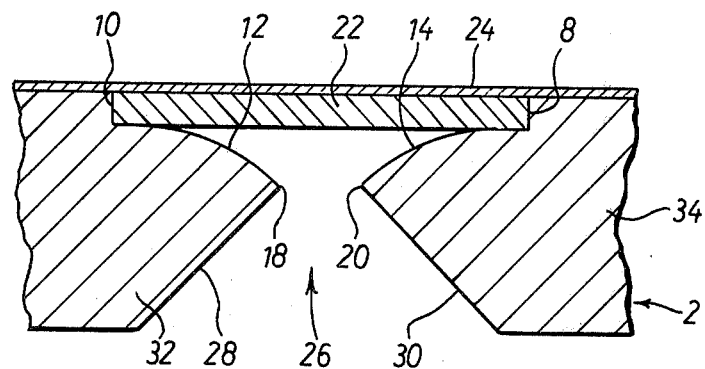
Fig_1
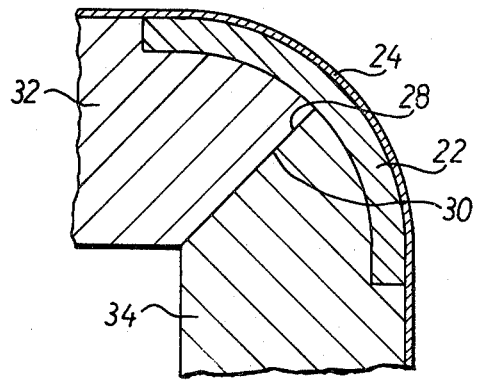
Fig_2
Fig_3
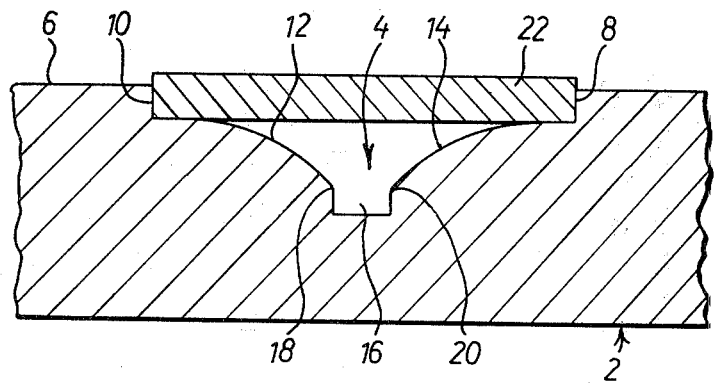

FOLDABLE STRUCTURE

The invention relates to a foldable structure and to a method of manufacturing a foldable structure which, when folded produces a curved edge or corner.

It is known to glue a flexible PVC laminate or lamina to chipboard and to machine a 90° V-shaped slot in the face of the chipboard remote from the face covered with the PVC lamina. The chipboard may subsequently be folded so as to produce a sharp right angled corner. The PVC lamina to some extent holds the chipboard in position once the slot has been cut and yet is sufficiently flexible to permit folding. Thus a sheet of chipboard or any other type of wood sheeting can be machined in the appropriate positions to enable it to be folded into, say, a cabinet or box. The procedure avoids the need for complicated mitre or dovetail joints which are traditionally used in cabinet construction. Further it enables cabinets to be shipped in flat form and then to be assembled easily on location.

It is desirable to be able to use a similar technique to produce a corner which is curved, rather than a sharp right angle. In one known arrangement one face of the chipboard has a recess machined into it, the recess having two curved surfaces extending toward one another. The PVC lamina is then glued to the face of the chipboard so as to pass over the recess. A 90° V-shaped slot which breaks through into the recess is then machined in the other face of the chipboard to facilitate folding. The two pieces of chipboard on either side of the slot or recess may then be folded relative to one another so that the PVC lamina abuts against the curved portion of the recess, so forming the required curved corner.

This known technique suffers from two disadvantages. Firstly, because the PVC lamina is very thin and because the lamina is not supported in the region of the recess and because it does not itself provide any support serving to hold the separated panels in register, the PVC lamina tends to crease during folding. Secondly, any, fragments of sawdust or wood chippings which are not removed from the recess after machining and before folding tend to show through the surface of the PVC when it is folded around the corner. Similarly if the curved portions of the recess are not cut smoothly and cleanly the irregularities will show through the PVC lamina.

It is the aim of the present invention to avoid the problems of creasing of the lamina during folding and to prevent irregularities showing through the surface lamina.

According to the present invention there is provided a method of manufacturing a foldable structure which when folded produces a curved edge or corner comprising the steps of forming a first elongate recess in a face of a panel member, locating a flexible bridging piece within said first elongate recess, applying a flexible lamina to said face and said flexible bridging piece, and forming a second elongate recess in the other face of the panel member, such that the second elongate recess breaks through into said first elongate recess to divide the panel member, a foldable region being defined by the flexible bridging piece and by that portion of the flexible lamina overlying the flexible bridging piece.

In a preferred form, the first elongate recess has two opposed shoulders which extend inwardly from said face and has a pair of curved surfaces which extend from the respective shoulders towards one another. Conveniently, the flexible bridging piece is bonded in position between the shoulders and if necessary the flexible bridging piece is made coplanar with said one face before the flexible lamina is bonded to said one face and the flexible bridging piece.

Advantageously the flexible bridging piece is a cork strip and the panel member is a sheet of chipboard or the like.

According to another aspect of the invention there is provided a foldable structure comprising two panel members having adjacent edges, a flexible insert member bridging the adjacent edges and a flexible lamina overlying the two panel members and the flexible insert member, a foldable region being defined by the insert member and by that portion of the flexible lamina overlying the flexible insert member.

Conveniently each adjacent edge of the panel member is rebated so as to provide a shoulder extending inwardly from a face of the panel member and to provide a curved surface extending from the shoulder to the edge of the panel member. The flexible insert member is positioned between the respective shoulders and is substantially co-planar with said face.

Conveniently the flexible lamina is secured to the two panel members and the flexible insert member.

Figure 5:
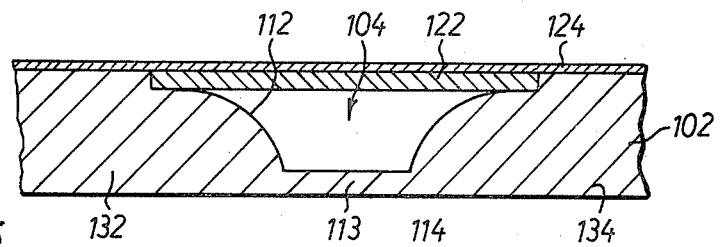
Figure 6:
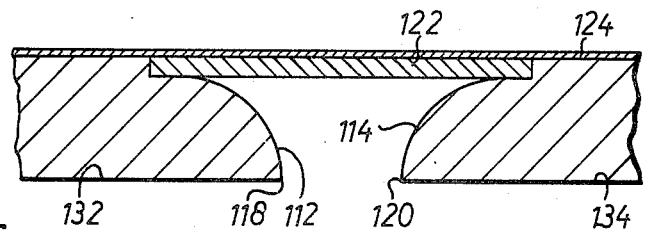
Figure 7:
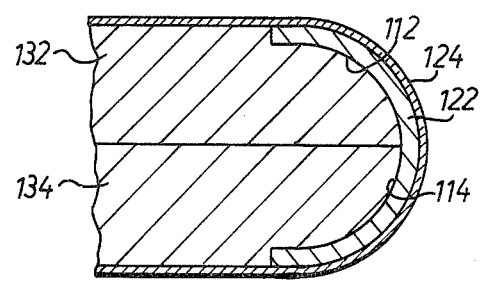
Figure 8:
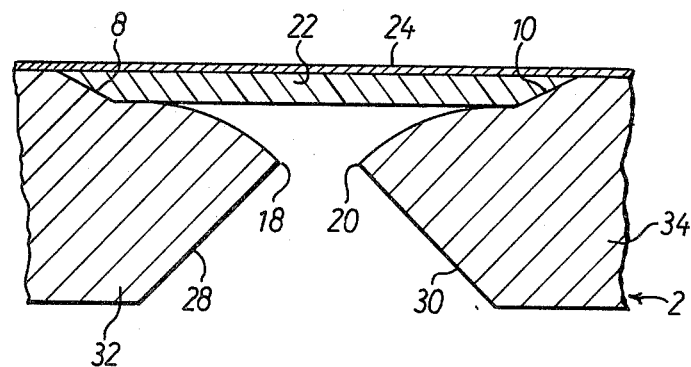
Figure 9:
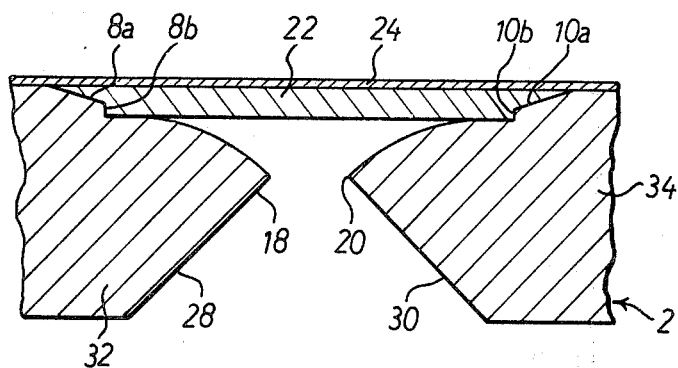

The present invention will now be described further, by way of example, only with reference to the accompanying drawings, in which:

FIG. 1 is a sectional view of a foldable structure according to one embodiment of the invention, FIG. 2 is a sectional view of the foldable structure of FIG. 1 when folded to produce a 90° curved corner, FIGS. 3 and 4 are sectional views of the partially manufactured foldable structure, FIGS. 5, 6 and 7 are sectional views of an alternative embodiment of a foldable structure, and FIGS. 8 and 9 are sectional views of further embodiments of foldable structures in accordance with the invention.

FIGS. 1, 3 and 4 show different stages in the manufacture of a foldable structure for folding into the 90° curved corner shown in FIG. 2. A substantially rigid member or panel member 2 for example a sheet of chipboard, has an elongate recess 4 machined into a face 6. As illustrated in the preferred embodiment the recess 4 has two shoulders 8,10 which extend inwardly from said face 6, and a pair of curved surfaces 12,14 which extend from the shoulders towards one another and which preferably are complementary surfaces terminating at extremities or edges 18,20 respectively. For convenience of machining a central groove 16 is provided between the two curved surfaces. As shown the surfaces 12, 14 are arcuate and extend through an arc of 45°.

A flexible bridging piece or insert member 22 is positioned between the shoulders 8,10 of the recess 4 and may be bonded in position. As shown the flexible bridging piece 22 projects outwardly from said face 6. FIG. 4 shows the same panel member or sheet of chipboard 2 and the recess 4, in which, the flexible bridging piece 22 has been sanded level with the said face 6 and a flexible lamina 24 which conveniently is a plastics material, preferably PVC, is bonded to the said face 6 and to the flexible bridging piece 22.

Next a slot or second recess 26 is machined in the other opposite face of the chipboard sheet or panel member 2. In the particular embodiment illustrated with reference to FIGS. 1 to 4 the recess 26 is in the form of a V-shaped slot, which has two faces 28, 30 at 90° to one another. Each face 28,30 terminates at the respective one of the edges 18,20. As shown in FIG. 1 the sheet of chipboard is separated into two pieces or panel members 32,34, the two pieces or panel members being held in positional relationship mainly by the flexible lamina 24 and partially by the flexible bridging piece 22. Thus FIG. 1 shows one embodiment of a foldable structure according to one aspect of the present invention.

To form the corner radius the two members or pieces of chipboard 32,34 are folded relative to one another so that the flexible lamina and the flexible bridging piece are curved around the curved surfaces 12,14. The two panel members may be secured in position by any convenient method, for example by glue applied to the faces 28,30. For the example shown where the curved corner has a 90° radius the curved surfaces each extend through an arc of 45° and the face 28,30 of the slot are at 90°.

Because the flexible bridging piece 22 is provided, any irregularities of the surfaces 12,14 are accommodated by the resilient nature of the material used. Because the flexible lamina is glued to the flexible bridging piece, creasing of the lamina is avoided when it is folded.

As shown in FIGS. 1 to 4 the flexible bridging piece is a close fit between the shoulders 8,10 of the recess 4. However, for manufacturing reasons there may well be a gap between the shoulders of the recess and the edges of the flexible cork strip. As described it is envisaged that it will be necessary to sand down the flexible strip to ensure that it is level with the face of the chipboard. However, it may be possible to avoid sanding down or using any other material removal process if the machining of the recess thickness or the cork strip can be controlled within acceptable tolerances.

FIGS. 5, 6 and 7 show an alternative embodiment of a foldable structure which enables a 180° curved edge to be achieved. The arrangement is identical to FIGS. 1 to 3 except that the curved surfaces 112,114 extend through an arc of 90° and the distance between the edges 118,120 is correspondingly increased to provide a sufficient length of PVC and cork to fold around the curved surfaces 112,114.

In a preferred method of manufacture of the embodiment a first elongate recess 104 is formed in the panel member 102. The first recess has complementary mirror imaged curved portions 112,114 which extend through an arc of approximately 80°. A portion 113 of the panel 102 remains intact whilst the flexible elongate bridging piece is located in position and the flexible lamina applied over the face of the panel and the flexible bridging piece. Next a second elongate recess is machined in the opposite face of the panel to produce curved portions 112,114 which extend through 90°. When the structure is folded a 180° bend is produced.

One possible problem with the aforementioned embodiments is that the transition between the panel and the flexible insert of the shoulder 8,10 may show through the PVC lamina as a line.

FIGS. 7 and 8 show alternative embodiments of the invention and parts corresponding to those in FIG. 1 have been identified with the same reference numerals.

The embodiment of FIG. 8 differs from the embodiment in FIGS. 1 to 4 in that the perpendicular shoulders 8,10 are inclined. Similarly the longitudinal edges of the flexible insert are tapered to correspond substantially to the shape of the inclined shoulders. The tapering of the edges in this way may produce a corner which, when folded, avoids the problem mentioned above.

The embodiment of FIG. 9 shows a further alternative in which the shoulders 8', 10' have both an inclined portion 8a, 10a and a substantially perpendicular portion 8b, 10b. The flexible insert 22 has its edges shaped to correspond. Such a construction has the advantage that the perpendicular shoulders provide positive location for the flexible insert, during manufacture, and the tapered edge provides a smoother corner.

The invention has been described with reference to 90° and 180° curved corners or edges although it will be appreciated that angles smaller or greater than this or any angle within the range may be employed. Additionally the corner may be made up of a series of straight edges rather than a continuous uninterrupted curve.

Whilst the preferred material onto which the flexible lamina is glued is chipboard or high density chipboard any other type of material may be used, for example, solid wood, ply-wood, block board, cellular plastics or even metal. Similarly the flexible bridging piece need not necessarily be restricted to cork, any other resilient flexible material may be used, for example polystyrene.

In an alternative method of manufacture it is envisaged that the panel members of the foldable structure may be assembled from individual pieces rather than machined from one piece. For example a piece of chipboard may be machined along one edge so as to form an inwardly directed shoulder and a curved surface extending from the shoulder to the edge of the board. Two of such pieces or panel members may be placed side by side, separated by the flexible bridging piece or insert member and then the flexible lamina glued in position. Thus the required foldable element will be produced. It is further envisaged that a foldable element may comprise two panel members having edges which are machined with preferably complementary curved surfaces, between which is fitted a flexible insert member. It is not necessary to have a shoulder or rebate in the recess, the flexible insert being appropriately shaped instead.

We claim:

1. A foldable planar structure for use in forming a curved edge or corner by bending the initially planar structure, the planar structure comprising two chipboard panel members, a flexible lamina formed of PVC material and a flexible strip-like cork insert member, the two panel members being disposed in side by side relation with a respective edge of each panel arranged in adjacent relation, and each panel member having an arcuate surface extending from said edge towards one face of the panel, the flexible insert member bridging said edges and backing up said flexible lamina, said flexible lamina overlying and being adhered to said one face of each panel member and to said cork insert member whereby, on bending the structure from its initially planar form, the flexible cork insert member contacts the said arcuate surfaces which define the shape of the curved edge or corner so formed.

2. A foldable structure according to claim 1 wherein said edge is formed at the intersection of said arcuate surface and an opposite face of said panel which opposite face is parallel to said one face, each arcuate surface extending through an arc of 90° so that when the structure is folded a 180° curved edge is formed.

3. A foldable structure according to claim 1 wherein each panel member has an inclined planar surface which intersects and extends between said edge and an opposite face of the panel, which opposite face is parallel with said one face.

4. A foldable structure according to claim 3 wherein each arcuate surface extends through an arc of 45° and the respective planar surfaces are disposed at 90° one to the other so that the panels of the structure lie at right angles to one another when the structure is folded.

5. A foldable structure according to claim 3 wherein each panel has a shoulder which is disposed between said arcuate surface and said one face.

6. A foldable structure according to claim 5 wherein said shoulder extends inwardly from said one face at an oblique angle.

7. A foldable structure according to claim 5 wherein the shoulder is perpendicular to and extends inwardly from said one face.

8. A foldable structure according to claim 5 wherein said shoulder has an inclined portion which extends inwardly from said one face at an oblique angle and a portion which is perpendicular to the said one face and which is disposed between the inclined portion and said arcuate surface.

9. A foldable structure according to claim 8 wherein the flexible insert member has respective longitudinal edges which correspond in shape to the said shoulders of the two panel members.

* * * * *